United States Patent
Eum et al.

(10) Patent No.: US 9,748,849 B2
(45) Date of Patent: Aug. 29, 2017

(54) POWER SUPPLY

(71) Applicant: FAIRCHILD KOREA SEMICONDUCTOR LTD., Bucheon-si (KR)

(72) Inventors: Hyun-Chul Eum, Seoul (KR); Young-Jong Kim, Bucheon-si (KR); In-Ki Park, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 65 days.

(21) Appl. No.: 14/324,704

(22) Filed: Jul. 7, 2014

(65) Prior Publication Data

US 2015/0009722 A1   Jan. 8, 2015

Related U.S. Application Data

(60) Provisional application No. 61/843,579, filed on Jul. 8, 2013, provisional application No. 61/844,470, filed on Jul. 10, 2013.

(30) Foreign Application Priority Data

Jun. 9, 2014   (KR) .......................... 10-2014-0069346

(51) Int. Cl.
*H02M 3/156* (2006.01)
*H02M 3/335* (2006.01)
(Continued)

(52) U.S. Cl.
CPC ..... *H02M 3/33507* (2013.01); *H02M 1/4258* (2013.01); *H05B 33/0815* (2013.01);
(Continued)

(58) Field of Classification Search
CPC ............ H02M 3/335; H02M 3/33507; H02M 3/33523; H02M 3/156; H02M 3/1563; H02M 3/1566; H02M 2001/0009
(Continued)

(56) References Cited

U.S. PATENT DOCUMENTS 5,841,641 A * 11/1998 Faulk .................... H02M 3/335
                                                                363/21.14
6,194,885 B1 * 2/2001 Oshima ............... H02M 1/4225
                                                                323/285
(Continued)

OTHER PUBLICATIONS

Brian Johnson, et al., Fairchild LED Seminar, Fairchild Semiconductor, Jun. 2013, 165 pages.
(Continued)

*Primary Examiner* — Gary L Laxton

(57) ABSTRACT

Provided is regulation of a line current. The regulation of the line current includes comparing a reference voltage with a line sensing voltage to generate a feedback voltage, and controlling a switching operation of a power switch using the feedback voltage. The reference voltage may be a voltage having a constant level, a voltage which varies according to an output current, or a voltage which follows a sine wave to compensate a power factor. Provided is sensing of an output current. The sensing of the output current includes sensing the output current using a feedback voltage corresponding to a voltage between both terminals of an inductor connected to a power switch, a peak of current flowing through the power switch, and a switching cycle of the power switch.

17 Claims, 10 Drawing Sheets

(51) Int. Cl.
*H02M 1/42* (2007.01)
*H05B 33/08* (2006.01)
*H02M 1/00* (2006.01)

(52) U.S. Cl.
CPC ............... *H02M 2001/0016* (2013.01); *H02M 2001/0019* (2013.01); *Y02B 70/126* (2013.01)

(58) Field of Classification Search
USPC .............. 363/21.12, 21.17, 97; 323/282, 285
See application file for complete search history.

(56) References Cited

U.S. PATENT DOCUMENTS

| | | | | |
|---|---|---|---|---|
| 8,279,631 | B2 * | 10/2012 | Yang | H02J 7/0072 |
| | | | | 363/20 |
| 8,971,076 | B2 * | 3/2015 | Nate | H02M 1/4225 |
| | | | | 323/207 |
| 2012/0020119 | A1 * | 1/2012 | Tang | H02M 1/425 |
| | | | | 363/21.02 |
| 2012/0087155 | A1 * | 4/2012 | Tang | H02M 1/4208 |
| | | | | 363/21.02 |

OTHER PUBLICATIONS

Seunguk Yang, Fairchild LED Lighting Solution, Fairchild Semiconductor, Apr. 19, 2013, 67 pages.
Seunguk Yang, Fairchild LED Lighting Solution, Fairchild Semiconductor, Apr. 17, 2013, 66 pages.
James Lee, LED Lighting New Product Concept, Fairchild Semiconductor PLM_Lighting, 14 pages.

* cited by examiner

POWER SUPPLY

CROSS-REFERENCE TO RELATED APPLICATION

This application claims priority to and the benefit of U.S. Patent Application No. 61/843,579 filed in the USPTO on Jul. 8, 2013 and U.S. Patent Application No. 61/844,470 filed in the USPTO on Jul. 10, 2013, and the priority and benefit of Korean Patent Application No. 10-2014-0069346 filed in the Korean Intellectual Property Office on Jun. 9, 2014, the entire contents of which are incorporated herein by reference.

BACKGROUND (a) Field

The invention relates to a power supply, and more particularly, to a power supply configured to regulate a line current and sense an output current.

(b) Description of the Related Art

A reference value should be set to regulate a line current. However, a conventional line current regulation method is performed under an open-loop condition, and it is difficult to set the reference value.

Information regarding an output current is required to regulate an output current. A resistor or a subsidiary coil is used to obtain the information.

SUMMARY

According to exemplary embodiments, a line current may be regulated in a desired waveform. Also, information regarding an output current may be obtained without an additional resistor or subsidiary coil.

According to one embodiment, the regulation of a line current includes comparing a reference voltage with a line sensing voltage to generate a feedback voltage, and controlling a switching operation of a power switch using the feedback voltage. The reference voltage may be a voltage having a constant level, a voltage which varies according to an output current, or a voltage which follows a sine wave to compensate a power factor.

According to another embodiment, the sensing of an output current includes sensing the output current using a feedback voltage corresponding to a voltage between both terminals of an inductor connected to a power switch, a peak of current flowing through the power switch, and a switching cycle of the power switch.

According to an aspect of the invention, there is provided a power supply including: a power switch configured to control transmission of power, a sensing resistor through which a line current flows, and a comparator configured to compare a reference voltage with a line sensing voltage generated by the sensing resistor and generate a feedback voltage. A duty of the power switch is determined using the feedback voltage.

The power supply may further include a duty determiner configured to generate a gate voltage in response to the feedback voltage. The power switch may perform a switching operation in response to the gate voltage.

The comparator may include a first terminal to which the reference voltage is input, and a second terminal to which the line sensing voltage is input. The comparator may generate the feedback voltage by amplifying a voltage obtained by subtracting the input of the first terminal from the input of the second terminal.

The power supply may further include a sawtooth wave generator configured to generate a sawtooth wave, and a pulse width modulation (PWM) comparator configured to output a result of a comparison between the feedback voltage and the sawtooth wave. The duty of the power switch may be controlled in response to the output of the PWM comparator.

The power supply may further include a set-reset (SR) latch including a first terminal to which an oscillator signal is input and a second terminal to which the output of the PWM comparator is input. The SR latch may turn on the power switch in response to the input of the first terminal thereof, and turn off the power switch in response to the input of the second terminal thereof.

The power supply may further include a PWM comparator configured to compare the feedback voltage with a voltage corresponding to current flowing through the power switch. The duty of the power switch may be controlled in response to the output of the PWM comparator.

The power supply may further include an SR latch including a first terminal to which an oscillator signal is input, and a second terminal to which the output of the PWM comparator is input. The SR latch may turn on the power switch in response to the input of the first terminal thereof, and turn off the power switch in response to the input of the second terminal thereof.

The reference voltage may have a constant level.

The power supply may further include an output comparator configured to generate the reference voltage based on a difference between a sensing voltage corresponding to an output current of the power supply and a predetermined output reference voltage.

The power supply may further include a clamping circuit configured to control a maximum value of the reference voltage. The clamping circuit may include a cathode connected to a clamping voltage and a diode including an anode connected to an output terminal of the output comparator. The maximum value of the reference voltage may be controlled by the clamping voltage.

The power supply may further include a PWM comparator configured to compare the feedback voltage with a voltage corresponding to current flowing through the power switch. The duty of the power switch may be controlled in response to the output of the PWM comparator.

The power supply may further include a sawtooth wave generator configured to generate a sawtooth wave, and a PWM comparator configured to output a result of a comparison between the feedback voltage and the sawtooth wave. The duty of the power switch may be controlled in response to the output of the PWM comparator.

The output reference voltage may be constant when a phase angle of an input voltage is equal to or higher than a predetermined angle, and the output reference voltage may vary according to the phase angle of the input voltage when the phase angle of the input voltage is lower than the predetermined angle.

The power supply may further include an output comparator configured to generate a first feedback voltage based on a difference between a sensing voltage corresponding to an output current of the power supply and a predetermined output reference voltage. The reference voltage may be generated based on the first feedback voltage and an input voltage obtained by rectifying an alternating current (AC) input of the power supply.

The power supply may further include a multiplier configured to generate the reference voltage by multiplying a voltage corresponding to the input voltage by the first feedback voltage.

The power supply may further include a phase inverter configured to generate a negative input detection voltage by inverting a polarity of an input detection voltage obtained by detecting the input voltage. The negative input detection voltage may be a voltage corresponding to the input voltage.

The line current may flow from a ground to a rectifier circuit configured to generate an input voltage by rectifying an AC input, the sensing resistor may be connected between the ground and the rectifier circuit, and the line sensing voltage may be a negative voltage.

According to another aspect of the invention, there is provided a power supply configured to supply an output current to a load. The power supply includes a power switch including one terminal connected to an input voltage, an inductor connected to the other terminal of the power switch, and a sensing controller configured to sense the output current using a peak of current of the inductor, a feedback voltage corresponding to a voltage between both terminals of the inductor, and a switching cycle of the power switch.

The sensing controller may sense the peak of the current of the inductor using current flowing through the power switch at a time point at which the power switch is turned off. The sensing controller may sense a discharge period after the time point at which the power switch is turned off, using the feedback voltage. The sensing controller may calculate the output current using the sensed peak of the current of the inductor, the discharge period, and the switching cycle of the power switch.

The sensing controller may calculate the output current based on a result obtained by multiplying the sensed peak of the current of the inductor by the discharge period and dividing the multiplied value by the switching cycle of the power switch.

A line current may be controlled in a desired waveform so that the line current can be regulated or a power factor can be improved. Also, an output current may be sensed without an additional resistor or a subsidiary coil.

DETAILED DESCRIPTION OF THE EMBODIMENTS

Figure 1:
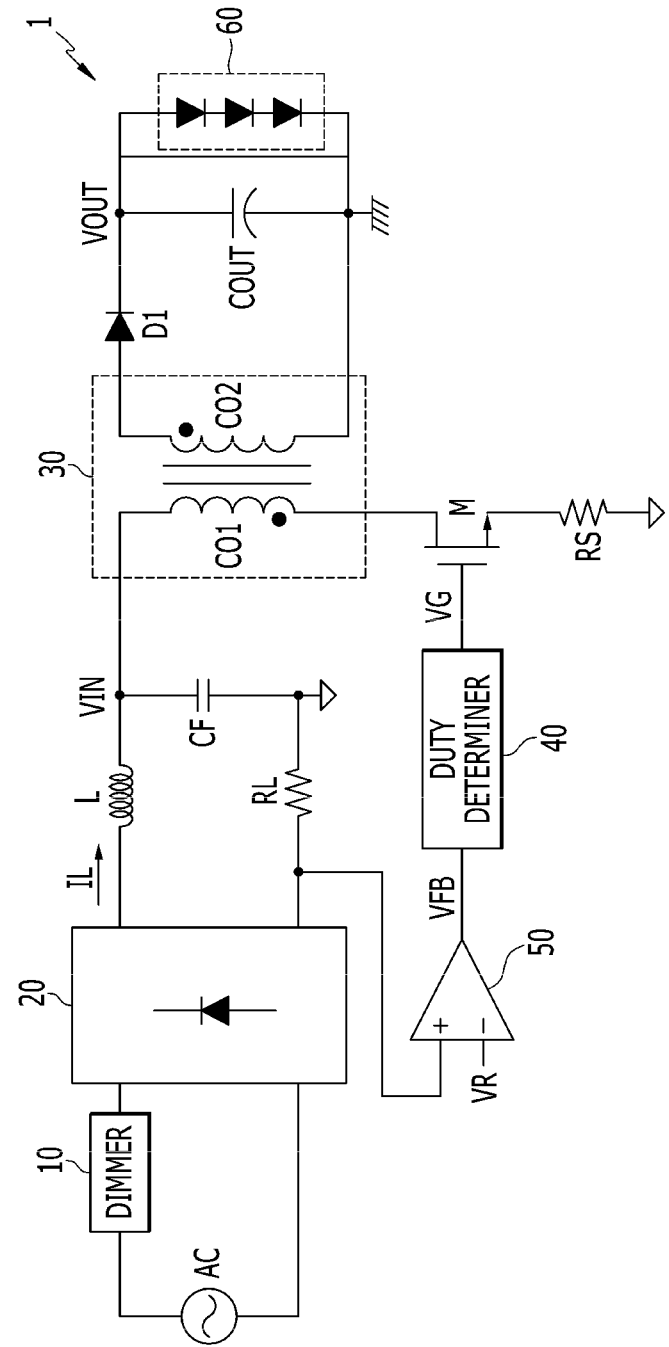
FIG. 1 is a diagram of a power supply according to an exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Descriptions of components and processing techniques that are irrelevant to the embodiments of the invention are omitted for brevity. It should be noted that like reference numerals in the drawings denote like elements.

As used herein, it will be understood that when an element is referred to as being "connected" or "coupled" to another element, it can be directly connected or coupled to the other element or electrically connected or coupled to the other element with another element intervening therebetween. As used herein, it will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

A line current regulation method according to exemplary embodiments of the invention may include sensing a line current and controlling a duty in response to the sensed line current. For example, the duty may increase when the line current is reduced, and be reduced when the line current increases. By controlling the duty in the way, the line current may be regulated.

Specifically, a feedback voltage may be generated based on the sensed line current, and the duty may be controlled in response to the feedback voltage. To generate the feedback voltage, a voltage corresponding to the sensed line current may be compared with a predetermined reference voltage. The reference voltage may be a constant value or vary according to an output current of a secondary side.

Hereinafter, a power supply to which a line current regulation method according to an exemplary embodiment of the invention is applied will be described with reference to the appended drawings.

FIG. 1 is a diagram of a power supply 1 according to an exemplary embodiment of the invention.

As shown in FIG. 1, the power supply 1 may include a dimmer 10, a rectifier circuit 20, a line sensing resistor RL, a transformer 30, a duty determiner 40, a rectifier diode D1, an output capacitor COUT, an inductor L, a power switch M, and a filter capacitor CF.

The transformer 30, the rectifier diode D1, and the power switch M may constitute a flyback converter. Although the power supply 1 according to the present embodiment is embodied by the flyback converter, the invention is not limited thereto.

The dimmer 10 may shape an alternating current (AC) input according to a dimmer angle.

The rectifier circuit 20 may rectify the shaped AC input. The inductor L may be connected to the rectifier circuit 20 so that a line current IL may flow through the inductor L. The filter capacitor CF may be connected between one end of a primary-side coil CO1 and a primary-side ground, and filter a switching current. An input voltage VIN, which may be a voltage supplied to the flyback converter, may be connected to the filter capacitor CF.

The line current IL may flow from the primary-side ground through the line sensing resistor RL into the rectifier circuit 20. The line current IL may be the sum of current supplied to the flyback converter and current flowing in the filter capacitor CF.

The input voltage VIN may be transmitted to one end of the primary-side coil CO1, and a drain of the power switch M may be connected to the other end of the primary-side coil CO1. A sensing resistor RS may be connected between a source of the power switch M and a ground. A gate voltage VG may be input to a gate of the power switch M. The power switch M may control power transmitted from an input terminal to an output terminal. In FIG. 1, the input terminal may be a primary side, the output terminal may be a secondary side, and the primary side may be electrically insulated from the secondary side.

The duty determiner 40 may receive a feedback voltage VFB and generate a gate voltage VG for determining a duty of the power switch M. For example, as the feedback voltage VFB increases, the duty determiner 40 may generate the gate voltage VG for increasing the duty of the power switch M.

Since the power switch M is an n-channel transistor, a level for turning on the power switch M may be a high level, while a level of turning off the power switch M may be a low level.

A comparator 50 may generate a feedback voltage VFB based on a result of comparison between a line sensing voltage VL and a reference voltage VR. The comparator 50 may include a non-inverting terminal (+) to which the line sensing voltage VL is input and an inverting terminal (−) to which the reference voltage VR is input. The comparator 50 may generate a feedback voltage VFB based on a difference between the input of the non-inverting terminal (+) and the input of the inverting terminal (−). For example, the comparator 50 may generate the feedback voltage VFB by amplifying a voltage obtained by subtracting the reference voltage VR, which is the input of the inverting terminal (−), from the line sensing voltage VL, which is the input of the non-inverting terminal (+).

Since a line current IL flowing through the line sensing resistor RL flows from the primary-side ground, the line sensing voltage VL may be a negative voltage. The reference voltage VR may also be set as a negative voltage.

The transformer 30 may include the primary-side coil CO1 and a secondary-side coil CO2. An anode electrode of the rectifier diode D1 may be connected to one end of the secondary-side coil CO2. When the rectifier diode D1 conducts, current flowing to the secondary-side coil CO2 may be transmitted to the output capacitor COUT and a load.

Although FIG. 1 illustrates an embodiment in which the load is a light emitting diode (LED) column 60 including a plurality of LEDs connected in series, the invention is not limited thereto.

When the power switch M is turned on, the line current IL may flow into the primary-side coil CO1, and energy may be stored in the primary-side coil CO1. The rectifier diode D1 may be in a non-conduction state during the turn-on period of the power switch M. When the power switch M is turned off and the rectifier diode D1 conducts, the energy stored in the primary-side coil CO1 may be transmitted to the secondary-side coil CO2, and current flowing in the secondary-side coil CO2 may flow through the rectifier diode D1.

When the line current IL increases, the line sensing voltage VL, which is a negative voltage, may be reduced. In an exemplary embodiment of the invention, a reduction in a negative voltage refers to an increase in the amplitude of a voltage. As the reduced line sensing voltage VL becomes lower than the reference voltage VR, the feedback voltage VFB may also decrease. Thus, a duty may be reduced.

In contrast, when the line current IL decreases, the line sensing voltage VL, which is the negative voltage, may increase. In an exemplary embodiment of the invention, an increase in a negative voltage refers to a reduction in the amplitude of a voltage. As the increasing line sensing voltage VL becomes higher than the reference voltage VR, the feedback voltage VFB may also increase. Thus, a duty may increase.

A regulation operation of maintaining the line current IL constant may be performed in the above-described manner. A method of controlling a duty may be variously changed.

For instance, the power switch M may be turned off based on a result of comparison between the feedback voltage VFB and a sawtooth wave.

Figure 2:
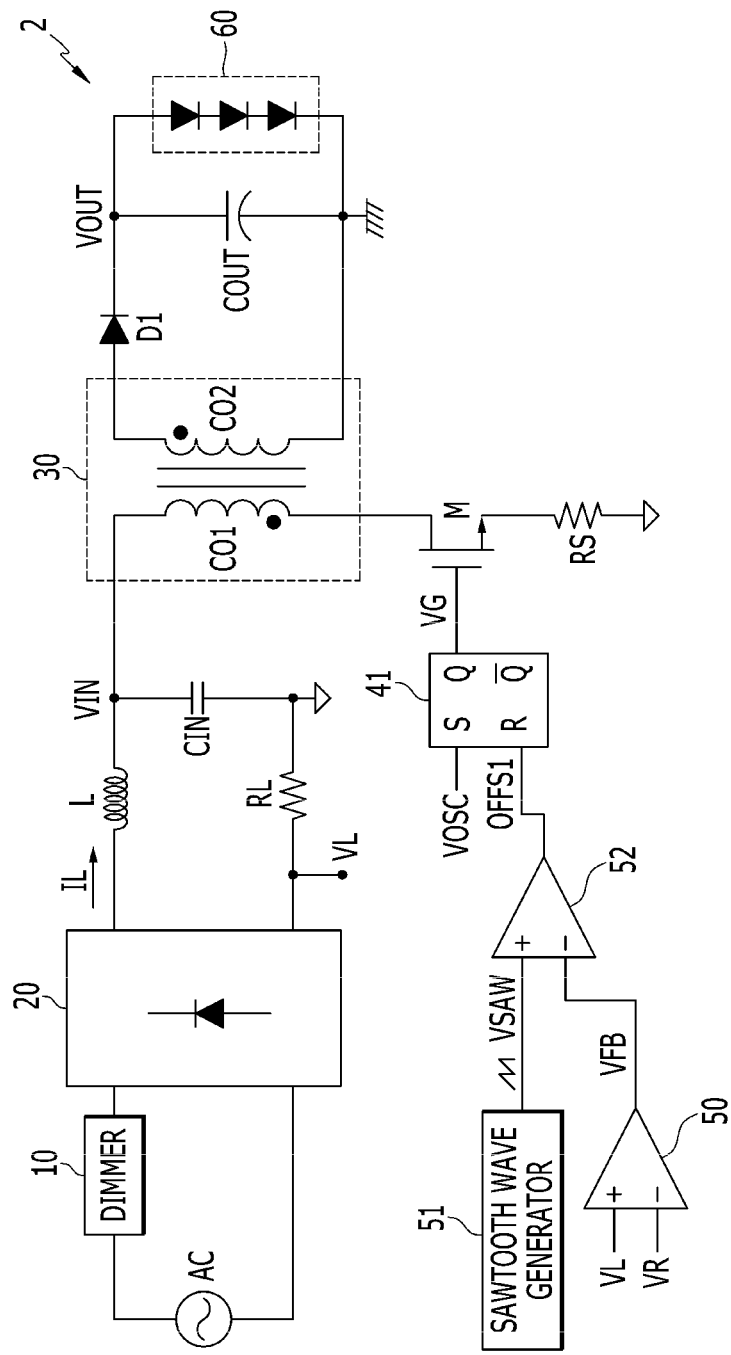
FIG. 2 is a diagram of a power supply according to another exemplary embodiment of the invention.

FIG. 2 is a diagram of a power supply 2 according to another exemplary embodiment of the invention. In the power supply shown in FIG. 2, a line current IL may be regulated in a voltage mode.

Elements of the power supply 2 according to the present embodiment that are the same as in the previous embodiments are denoted by the same reference numerals, and descriptions thereof are omitted here.

As shown in FIG. 2, the power supply 2 may include a sawtooth wave generator 51, a pulse width modulation (PWM) comparator 52, and a set-reset (SR) latch 41.

The comparator 50 may generate a feedback voltage VFB based on a result of comparison between a line sensing voltage VL and a reference voltage VR.

The sawtooth wave generator 51 may generate a sawtooth wave VSAW having a predetermined cycle. The cycle of the sawtooth wave VSAW may be determined based on a switching cycle of a power switch. For example, a time point at which the power switch M is turned on may be synchronized with a time point at which the rise of the sawtooth wave VSAW starts.

The PWM comparator 52 may generate an off control signal OFFS1 based on a result of comparison between the sawtooth wave VSAW and the feedback voltage VFB. The PWM comparator 52 may include a non-inverting terminal (+) to which the sawtooth wave VSAW is input and an inverting terminal (−) to which the feedback voltage VFB is input.

When the PWM comparator 52 may output a high-level signal when the input of the non-inverting terminal (+) is equal to or higher than the input of the inverting terminal (−), and output a low-level signal when the input of the non-inverting terminal (+) is lower than the input of the inverting terminal (−). For example, the PWM comparator 52 may generate a high-level off control signal OFFS1 when the rising sawtooth wave VSAW reaches the feedback voltage VFB.

The SR latch 41 may include a set terminal S to which an oscillator signal VOSC is input, and a reset terminal R to which an off control signal OFFS12 is input. The SR latch 41 may generate a high-level gate voltage VG when the input of the set terminal S is at a high level, and generate a low-level gate voltage VG when the input of the reset terminal R is at a high level. The SR latch 41 may output the gate voltage VG through an output terminal Q thereof.

The SR latch 41 may control a time point at which the power switch M is turned on in response to an oscillator signal VOSC, and control a time point at which the power switch M is turned off in response to an off control signal OFFS1.

For example, the SR latch 41 may generate a high-level gate voltage VG at a time point at which the oscillator signal VOSC rises to a high level, and generate a low-level gate voltage VG at a time point at which the off control signal OFFS1 rises to a high level during a turn-on period. The gate voltage VG may rise to a high level again at a time point at which the next oscillator signal VOSC rises to a high level.

As described above, the feedback voltage VFB may be determined by the line current IL, and a duty of the power switch M may be determined by the feedback voltage VFB and the sawtooth wave VSAW. Thus, the line current IL may be regulated.

In a method of controlling a duty according to another modified embodiment, the power switch M may be turned off based on a result of comparison between a drain current flowing through the power switch M and the feedback voltage VFB.

Figure 3:
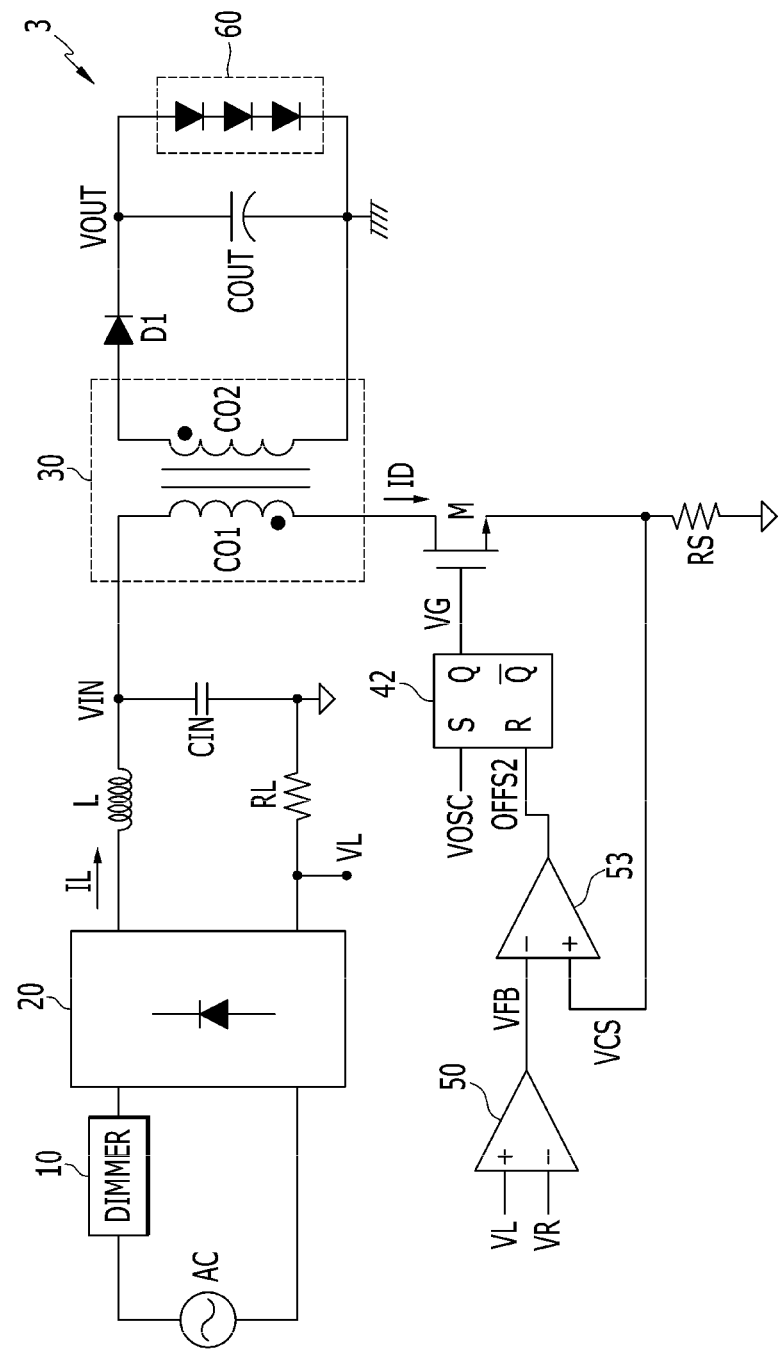
FIG. 3 is a diagram of a power supply according to another exemplary embodiment of the invention.

FIG. 3 is a diagram of a power supply 3 according to another exemplary embodiment of the invention. In the power supply shown in FIG. 3, a line current IL may be regulated in a current mode.

Elements of the power supply 3 according to the present embodiment that are the same as in the previous embodiments are denoted by the same reference numerals, and descriptions thereof are omitted here.

As shown in FIG. 3, the power supply 3 may include a PWM comparator 53 and an SR latch 42.

A comparator 50 may generate a feedback voltage VFB based on a result of comparison between a line sensing voltage VL and a reference voltage VR. The PWM comparator 53 may generate an off control signal OFFS2 based on a result of comparison between a sensing voltage VCS and the feedback voltage VFB. The PWM comparator 53 may include a non-inverting terminal (+) to which the sensing voltage VCS is input, and an inverting terminal (−) to which the feedback voltage VFB is input. The sensing voltage VCS may be a voltage generated in response to a drain current ID flowing through a resistor RS when the power switch M is turned on.

The PWM comparator 53 may output a high-level signal when the input of the non-inverting terminal (+) is equal to or higher than the input of the inverting terminal (−), and output a low-level signal when the input of the non-inverting terminal (+) is lower than the input of the inverting terminal (−). For example, the PWM comparator 53 may generate a high-level off control signal OFFS2 when the rising sensing voltage VCS reaches the feedback voltage VFB.

The SR latch 42 may include a set terminal S to which an oscillator signal VOSC is input, and a reset terminal R to which the off control signal OFFS2 is input. The SR latch 42 may generate a high-level gate voltage VG when the input of the set terminal S is at a high level, and generate a low-level voltage VG when the input of the reset terminal R is at a high level. The SR latch 42 may output the gate voltage VG through an output terminal Q thereof.

The SR latch 42 may control a time point at which the power switch M is turned on in response to an oscillator signal VOSC, and control a time point at which the power switch M is turned off in response to an off control signal OFFS2.

For instance, the SR latch 42 may generate a high-level gate voltage VG at a time point at which the oscillator signal VOSC rises to a high level, and generate a low-level gate voltage VG at a time point at which the off control signal OFFS2 rises to a high level during a turn-on period. The gate voltage VG may rise to a high level at a time point at which the next oscillator signal VOSC rises to a high level.

As described above, the feedback voltage VFB may be determined by the line current IL, and a duty of the power switch M may be determined by the feedback voltage VFB and the sensing voltage VCS. Thus, the line current IL may be regulated.

A line current regulation method according to another exemplary embodiment of the invention may include determining a reference voltage VR in response to an output current and determining a feedback voltage based on a result of comparison between a line sensing voltage and the reference voltage VR.

While the previous embodiment describes an example in which the reference voltage VR is a voltage having a constant level, the present embodiment provides an example in which a reference voltage varies according to a result obtained by sensing an output current.

Figure 4:
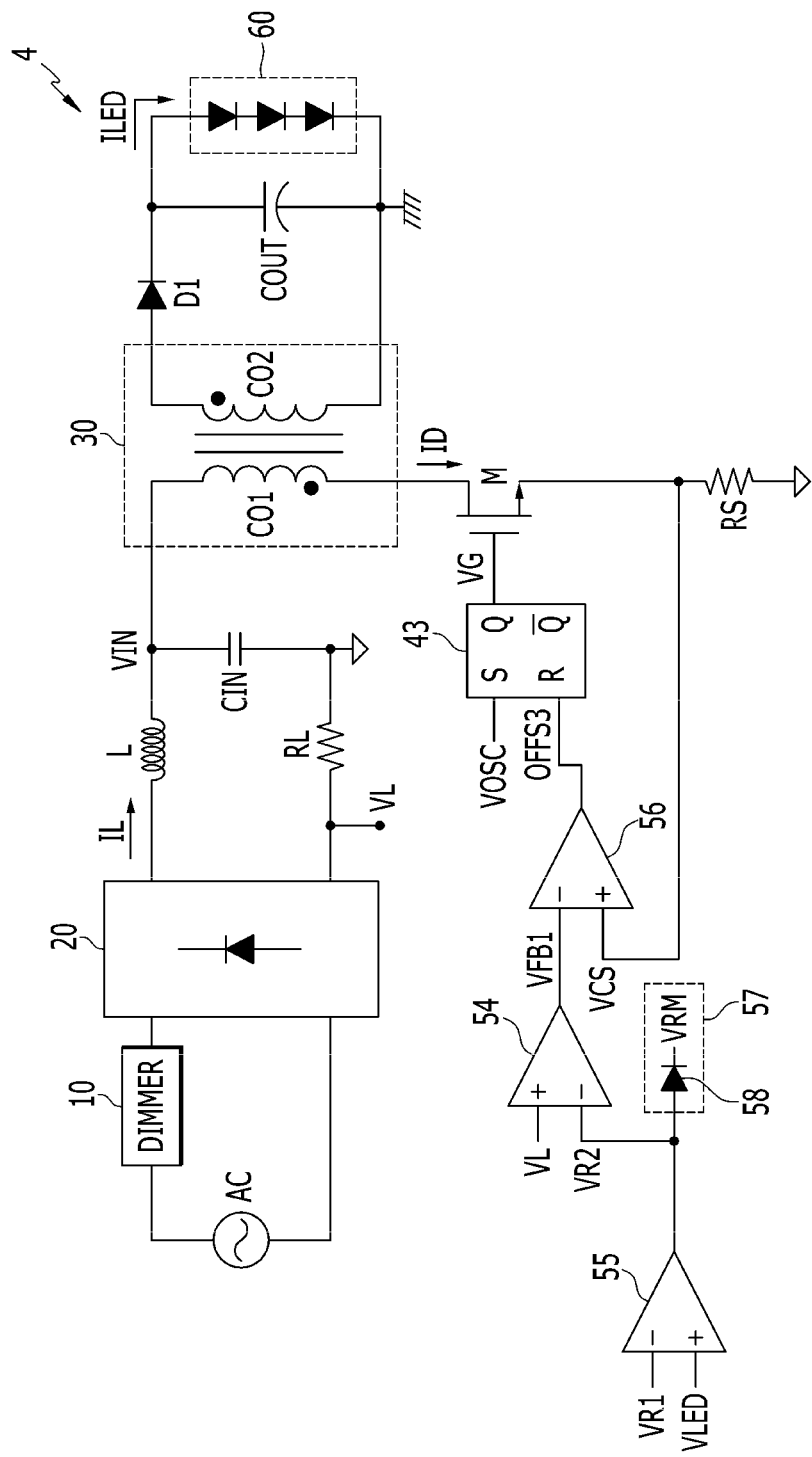
FIG. 4 is a diagram of a power supply according to another exemplary embodiment of the invention.

FIG. 4 is a diagram of a power supply 4 according to another exemplary embodiment of the invention. In the power supply shown in FIG. 4, a line current IL may be regulated in a current mode.

Elements of the power supply 4 according to the present embodiment that are the same as in the previous embodiments are denoted by the same reference numerals, and descriptions thereof are omitted here.

As shown in FIG. 4, the power supply 4 may include an output comparator 55, a line comparator 54, a PWM comparator 56, a clamping circuit 57, and an SR latch 43.

The output comparator 55 may generate a reference voltage VR2 for generating a feedback voltage VFB using an LED sensing voltage VLED corresponding to an LED current ILED and an output reference voltage VR1. The LED sensing voltage VLED may be received from a secondary side through an opto-coupler (not shown) or sensed using a subsidiary coil on a primary side.

Specifically, a voltage obtained by directly sensing the LED current ILED flowing through an LED column 60 may be transmitted to the primary side through the opto-coupler to generate the LED sensing voltage VLED. Alternatively, the LED sensing voltage VLED corresponding to the LED current ILED may be generated using a voltage between both terminals of a subsidiary coil that is insulatively coupled to a second coil of a transformer 30 on a primary side.

The LED current ILED is an example of an output current of the power supply 4, and the invention is not limited thereto.

An output of the output comparator 55, that is, a reference voltage VR2, may be determined such that the LED sensing voltage VLED is regulated to the output reference voltage VR1. For example, the output comparator 55 may generate an output corresponding to a result obtained by subtracting the LED sensing voltage VLED from the output reference voltage VR1 input to a non-inverting terminal (+).

The output reference voltage VR1 may be a reference voltage, which may determine the amount of the LED current ILED. The output reference voltage VR1 may be constant when a phase angle of an AC input passing through the dimmer 10 is large, and vary according to the phase angle when the phase angle is less than the predetermined angle.

Figure 9:
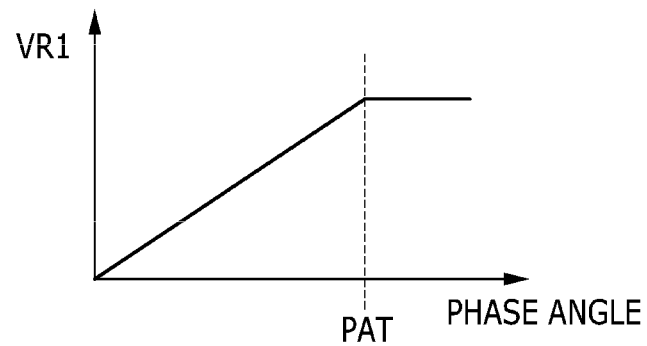
FIG. 9 is a signal waveform diagram of an output reference voltage relative to a phase angle.

FIG. 9 is a waveform diagram of an output reference voltage VR1 relative to a phase angle.

As shown in FIG. 9, the output reference voltage VR1 may be constant when a phase angle is larger than phase angle tilting (PAT), and vary in proportion to the phase angle when the phase angle is less than the PAT.

When the LED sensing voltage VLED becomes lower than the output reference voltage VR1, the reference voltage VR2 may be reduced. Thus, a switching operation may be controlled to increase output power. For example, a duty of a power switch M may increase.

Accordingly, as a reference voltage VR2 of a line sensing voltage VL is reduced, a larger amount of line current IL may flow, the LED current ILED may increase, and the LED sensing voltage VLED may increase with a rise in the output reference voltage VR1. The LED current ILED may be regulated in the above-described manner.

A maximum value of the reference voltage VR2, which is a negative voltage, may be controlled by the clamping circuit 57.

The clamping circuit 57 may include a diode 58, which may include a cathode connected to a clamping voltage VRM, and an anode connected to an output terminal of the output comparator 55, that is, the reference voltage VR2.

When the reference voltage VR2 increases and becomes higher than the clamping voltage VRM, the diode 58 may conduct so that the reference voltage VR2 can be the clamping voltage VRM.

The line comparator 54 may generate a feedback voltage VFB1 based on a result of comparison between the line sensing voltage VL and the reference voltage VR2.

The PWM comparator 56 may generate an off control signal OFFS3 based on a result of comparison between a sensing voltage VCS and the feedback voltage VFB1. The PWM comparator 56 may include a non-inverting terminal (+) to which the sensing voltage VCS is input and an inverting terminal (−) to which the feedback voltage VFB1 is input. The sensing voltage VCS may be a voltage generated in response to a drain current ID flowing through a resistor RS when the power switch M is turned on.

The PWM comparator 56 may output a high-level signal when the input of the non-inverting terminal (+) is equal to or higher than the input of the inverting terminal (−), and output a low-level signal when the input of the non-inverting terminal (+) is lower than the input of the inverting terminal (−). For example, the PWM comparator 56 may generate a high-level off control signal OFFS3 when the rising sensing voltage VCS reaches the feedback voltage VFB1.

The SR latch 43 may include a set terminal S to which an oscillator signal VOSC is input, and a reset terminal R to which the off control signal OFFS3 is input. The SR latch 43 may generate a high-level gate voltage VG when the input of the set terminal S is at a high level, and generate a low-level gate voltage VG when the input of the reset terminal R is at a high level. The SR latch 43 may output the gate voltage VG through an output terminal Q thereof.

The SR latch 43 may control a time point at which the power switch M is turned on in response to the oscillator signal VOSC, and control a time point at which the power switch M is turned off in response to the off control signal OFFS3.

For example, the SR latch 43 may generate a high-level gate voltage VG at a time point at which the oscillator signal VOSC rises to a high level, and generate a low-level gate voltage VG at a time point at which the off control signal OFFS3 rises to a high level during a turn-on period.

Hereinafter, operations of a power supply according to another exemplary embodiment of the invention will be described with reference to FIG. 5.

Figure 5:
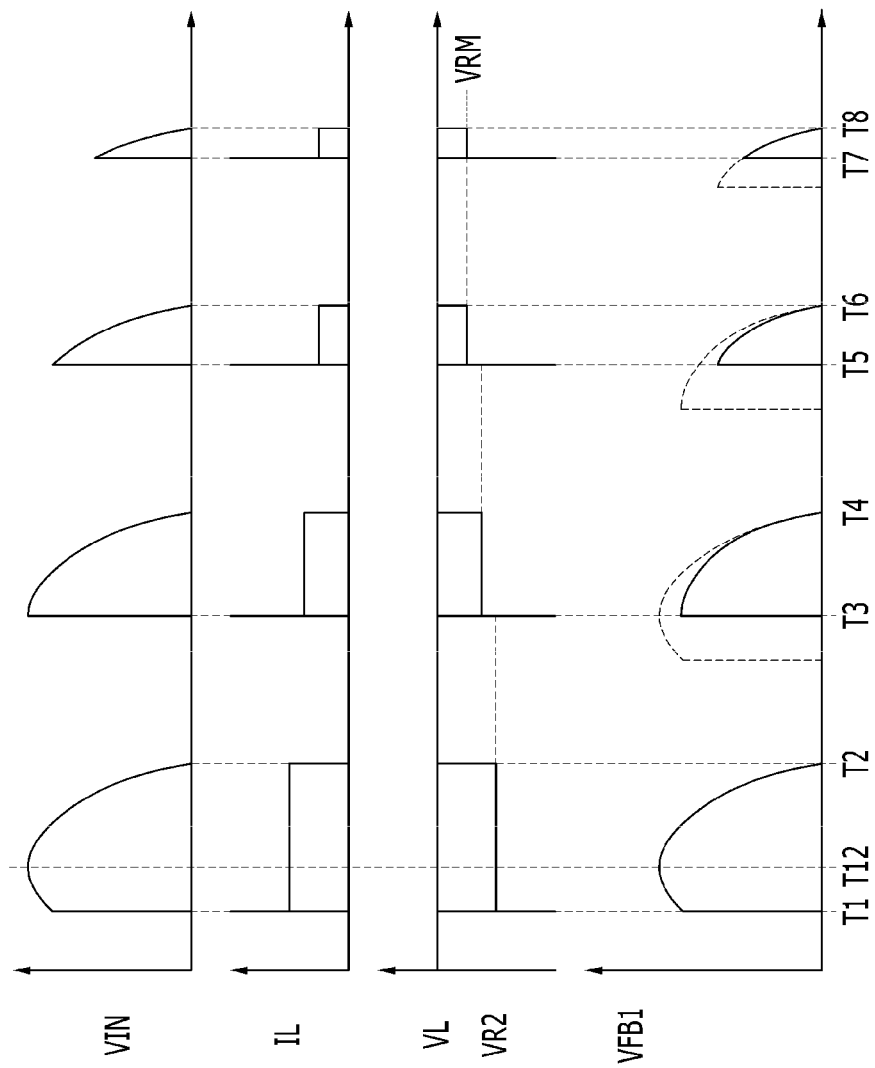
FIG. 5 is a signal waveform diagram of an input voltage, a line current, a line sensing voltage, a reference voltage, and a feedback voltage according to another exemplary embodiment of the invention.

FIG. 5 is a signal waveform diagram of an input voltage VIN, a line current IL, a line sensing voltage VL, a reference voltage, and a feedback voltage VFB1 according to another exemplary embodiment of the invention.

FIG. 5 illustrates an input voltage VIN when a dimming angle of a dimmer is gradually reduced. A peak of the line current IL occurs at a time point T1 at which the input voltage VIN occurs. The line sensing voltage VL, which is a negative voltage, is controlled to be equal to the reference voltage VR2. When the input voltage VIN becomes a zero voltage at a time point T2, the line current IL does not occur, and the line sensing voltage VL also becomes a zero voltage.

During a period T1-T2 for which the input voltage VIN occurs, a feedback voltage VFB1 occurs in response to the line sensing voltage VL and the reference voltage VR2. Since the reference voltage VR2 occurs in response to an LED sensing voltage VLED, the feedback voltage VFB1 varies according to an output current, and an output current regulation process is performed in a close loop.

For example, when the peak of the input voltage VIN is 100 V at a time point T12 during the period T1-T2 of FIG. 5, the feedback voltage VFB1 is 1 V. After the time point T12, when the input voltage VIN is dropped from 100 V to 99 V and the feedback voltage VFB1 of about 1 V is maintained, the duty is increased. Thus, the line current IL is increased, so that the line sensing voltage VL, which is the negative voltage, decreases (an absolute value of the line sensing voltage VL is increased).

As a result, the line sensing voltage VL decreases somewhat lower than the reference voltage VR2, and thus the feedback voltage VFB1, which is the output of the line comparator 54, decreases to some extent (e.g., about 0.99V). Since the feedback voltage VFB1 decreases to some extent, a duty is decreased, the line current IL decreases at an input voltage VIN of 99 V, and the line sensing voltage VL, which is the negative voltage, increases again (the absolute value of the line sensing voltage VL decreases) and becomes close to the reference voltage VR2. The feedback voltage VFB1 is generated in the above-described manner.

While the line sensing voltage VL is the zero voltage, the feedback voltage VFB1 is generated in response to the reference voltage VR2, which is the negative voltage. For example, since the reference voltage VR2 is input to the inverting terminal (−) of the line comparator 54, the feedback voltage VFB1 may be a positive voltage having a constant level.

Next, the peak of the line current IL occurs at a time point T3 at which the input voltage VIN occurs. The line sensing voltage VL, which is the negative voltage, is controlled to be equal to the reference voltage VR2. When the input voltage VIN becomes a zero voltage at the time point T4, the line current IL does not occur, and the line sensing voltage VL also becomes a zero voltage. During a period T3-T4 for which the input voltage VIN occurs, the feedback voltage VFB1 occurs in response to the line sensing voltage VL and the reference voltage VR2.

A phase angle of the input voltage VIN of the period T3-T4 becomes smaller than that of the input voltage VIN of the period T1-T2. For example, it can be inferred that an output reference voltage VR1 shown in FIG. 9 varies according to a relationship between the output reference voltage VR1 and a phase angle.

Thus, a reduction in the phase angle leads to a reduction in the output reference voltage VR1. Thus, an LED current ILED is also reduced, and an LED sensing voltage VLED is reduced. Accordingly, the reference voltage VR2 varies such that the LED sensing voltage VLED is reduced in response to the output reference voltage VR1 in a feedback loop described with reference to FIG. 4.

Also, the feedback voltage VFB1 is determined such that the line sensing voltage VL varies according to the varied reference voltage VR2. For example, as shown in FIG. 5, the reference voltage VR2 becomes higher during the period T3-T4 than during the period T1-T2 (an absolute value of the reference voltage VR2 is reduced), and the feedback voltage VFB1 is determined such that the line sensing voltage VL becomes equal to the reference value VR2.

As compared with the feedback voltage VFB1 of the period T1-T2, the phase and overall shape of the feedback voltage VFB1 of the period T3-T4 are changed. The feedback voltage VFB1 of the period T1-T2 is illustrated with a dotted line and overlapped by the feedback voltage VFB1 of the period T3-T4 in FIG. 5, and as shown, the feedback voltage VFB1 of the period T3-T4 is lower than the feedback voltage VFB1 of the period T1-T2 illustrated with the dotted line.

A phase angle of the input voltage VIN of a period T5-T6 becomes smaller than that of the input voltage VIN of the period T3-T4. Thus, as shown in FIG. 5, the reference voltage VR2 becomes higher in the period T5-T6 than in the period T3-T4 (an absolute value of the reference voltage VR2 is reduced), and the feedback voltage VFB1 is determined such that the line sensing voltage VL becomes equal to the reference voltage VR2.

As compared with the feedback voltage VFB1 of the period T3-T4, the phase and overall shape of the feedback voltage VFB1 of the period T5-T6 are changed. The feedback voltage VFB1 of the period T3-T4 is illustrated with a dotted line and overlapped by the feedback voltage VFB1 of the period T5-T6 in FIG. 5, and as shown, the feedback voltage VFB1 of the period T5-T6 is lower than the feedback voltage VFB1 of the period T3-T4 illustrated with the dotted line.

The increased reference voltage VR2 is clamped to a clamping voltage VRM. Thus, even if the phase angle of the input voltage VIN is further reduced, the reference voltage VR2 may be maintained at the clamping voltage VRM.

As described above, when the input voltage VIN having a reduced phase angle occurs during the period T5-T6, the reference voltage VR2 reaches the clamping voltage VRM. Afterwards, the input voltage VIN having a further reduced phase angle occurs during a period T7-T8. As shown in FIG. 5, the reference voltage VR2 of the period T7-T8 is maintained at the same clamping voltage VRM as the reference voltage VR2 of the period T5-T6.

Even if the phase angle of the input voltage VIN is further reduced after the period T7-T8, the feedback voltage VFB1 is determined by the clamping voltage VRM and the line sensing voltage VL.

After the period T5-T6, the feedback voltage VFB1 of the period T7-T8 for which the phase angle of the input voltage VIN is further reduced has a waveform shown in FIG. 5. As shown in FIG. 5, the feedback voltage VFB1 is determined such that the line sensing voltage VL becomes equal to the reference voltage VR2. The feedback voltage VFB1 of the period T7-T8 corresponding to the phase angle of the input voltage VIN occurs within the waveform of the feedback voltage VFB1 of the period T5-T6. That is, the feedback voltage VFB1 of the period T5-T6 is illustrated with a dotted line and overlapped by the feedback voltage VFB1 of the period T7-T8 in FIG. 5, and the feedback voltage VFB1 of the period T5-T6 has the same amplitude as the feedback voltage VFB1 of the period T7-T8 and a different phase from the feedback voltage VFB1 of the period T7-T8.

Since the line current IL of the period T7-T8 is also controlled by the clamping voltage VRM, the line current IL of the period T7-T8 has the same amplitude as the line current IL of the period T5-T6.

Accordingly, when the reference voltage VR2 is clamped to the clamping voltage VRM, the LED sensing voltage VLED is higher than the output reference voltage VR1. However, since the reference voltage VR2 cannot become higher, the LED sensing voltage VLED cannot be regulated in the same manner as the output reference voltage VR1. Thus, the LED sensing voltage VLED may be controlled not in a closed loop but in an open loop.

Figure 10:
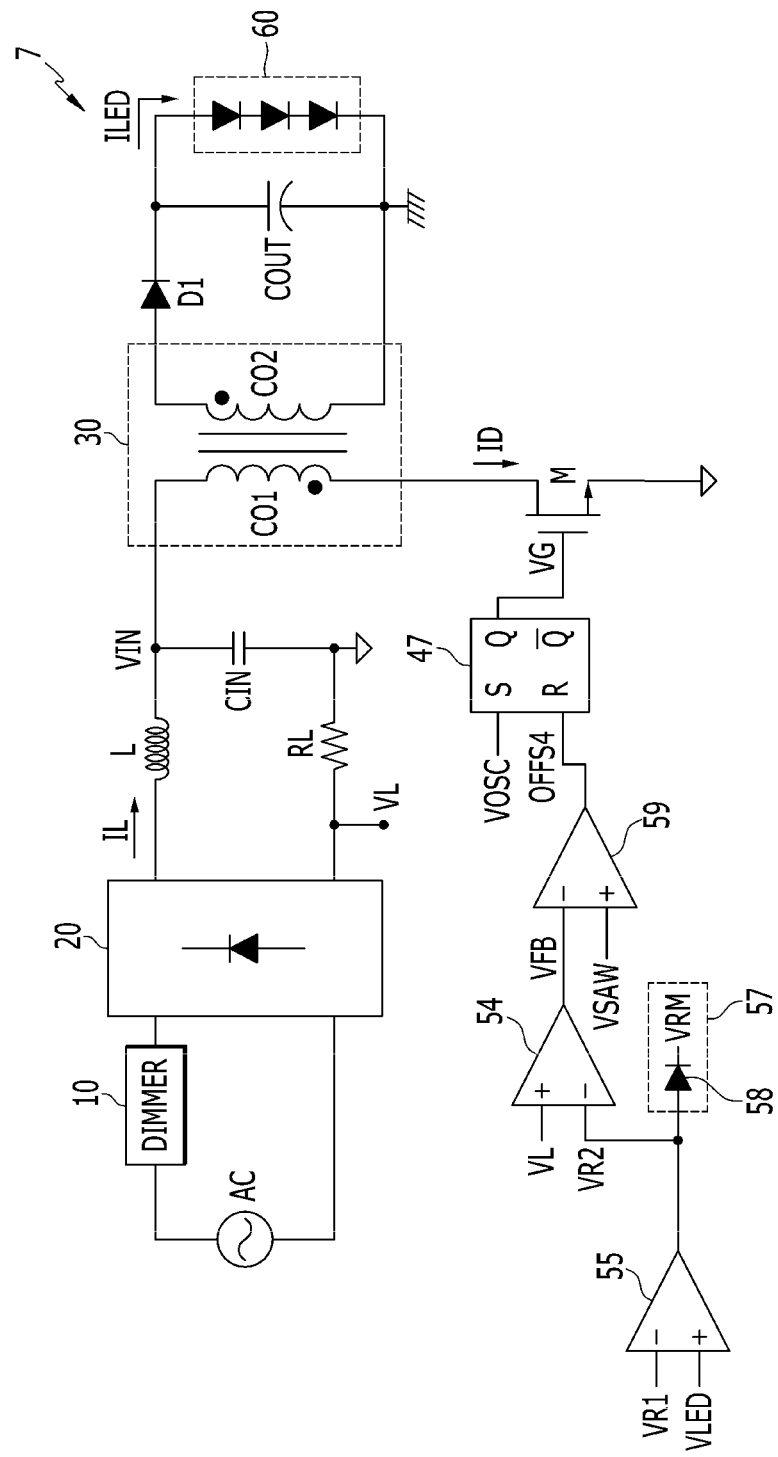
FIG. 10 is a diagram of a power supply according to another exemplary embodiment of the invention.

In addition, although FIG. 4 illustrates an embodiment in which the switching operation of the power switch M is controlled by comparing the feedback voltage VFB1 with the sensing voltage VCS, the invention is not limited thereto. As shown in FIG. 10, an off control signal OFFS4 may be generated by comparing the feedback voltage VFB1 with a sawtooth wave VSAW instead of the sensing voltage VCS.

FIG. 10 is a diagram of a power supply 7 according to another exemplary embodiment of the invention.

As shown in FIG. 10, the power supply 7 may include a PWM comparator 59. The PWM comparator 59 may include a non-inverting terminal (+) to which a sawtooth wave VSAW is input, and an inverting terminal (−) to which a feedback voltage VFB1 is input. The PWM comparator 59 may output a high-level off control signal OFFS4 when the input of the non-inverting terminal (+) is equal to or higher than the input of the inverting terminal (−), and generate a low-level off control signal OFFS4 when the input of the non-inverting terminal (+) is lower than the input of the inverting terminal (−).

The SR latch 47 may control a gate voltage VG for turning on a power switch M due to an oscillator signal OSC input to a set terminal S, and control a gate voltage VG for turning off the power switch M due to the off control signal OFFS4 input to a reset terminal R. Since the sawtooth wave VSAW and the oscillator signal VOSC are described above, detailed descriptions thereof are omitted.

As described above, in the power supply 7 according to another exemplary embodiment of the invention, a switching operation may be controlled in consideration of not only an input current regulation process but also an output current regulation process.

A power factor may be further improved as a line current approaches the phase of an input voltage. In another exemplary embodiment of the invention, a reference voltage may follow a sine wave rather than having a constant level.

Figure 6:
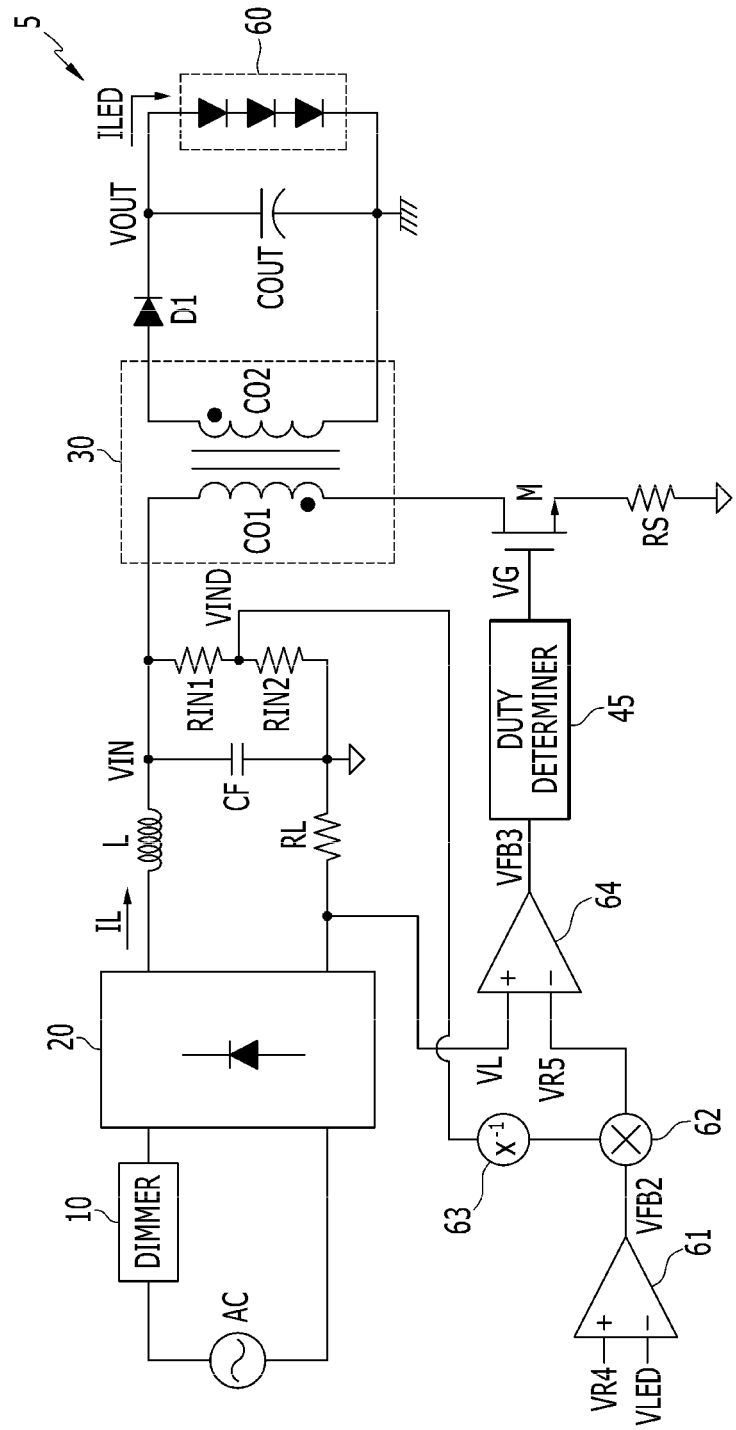
FIG. 6 is a diagram of a power supply according to another exemplary embodiment of the invention.

FIG. 6 is a diagram of a power supply 5 according to another exemplary embodiment of the invention.

As shown in FIG. 6, the power supply 5 may detect an input voltage VIN and generate a reference voltage VR4, which is a sine wave, in response to the input voltage VIN.

The same elements as in the above-described embodiments are denoted by the same reference numerals, and detailed descriptions thereof are omitted here.

As shown in FIG. 6, the power supply 5 may include two resistors RIN1 and RIN2, an output comparator 61, a multiplier 62, a polarity inverter 63, a line comparator 64, and a duty determiner 45.

The two resistors RIN1 and RIN2 may be connected in series between the input voltage VIN and a primary-side ground. The input voltage VIN may be divided by the two resistors RIN1 and RIN2 to generate an input detection voltage VIND.

The output comparator 61 may generate a first feedback voltage VFB2 using an LED sensing voltage VLED corresponding to an LED current ILED and the output reference voltage VR4. The LED sensing voltage VLED may be received from a secondary side through an opto-coupler or sensed using a primary-side subsidiary coil, and detailed descriptions thereof were presented in the previous embodiment with reference to FIG. 4.

The output comparator 61 may output a difference between the output reference voltage VR4 and the LED sensing voltage VLED. For example, the output comparator 61 may generate an output corresponding to a result obtained by subtracting the LED sensing voltage VLED from the output reference voltage VR4 input to a non-inverting terminal (+). The output of the output comparator 61 may become the first feedback voltage VFB2. The output reference voltage VR4 may be set as a higher voltage than the LED sensing voltage VLED. Thus, the first feedback voltage VFB2, which is the output of the output comparator 61, may be generated as a positive voltage that varies in an opposite direction to a direction in which the output current ILED varies.

For instance, when the output current ILED is reduced, the LED sensing voltage VLED may be reduced so that the difference between the LED sensing voltage VLED and the output reference voltage VR4 can increase. Thus, the first feedback voltage VFB2 increases. Conversely, when the output current ILED increases, the LED sensing voltage VLED may increase so that the difference between the LED sensing voltage VLED and the output reference voltage VR4 can be reduced. Thus, the first feedback voltage VFB2 is reduced.

When a peak of the input voltage VIN increases, the output current ILED may increase. Conversely, when the peak of the input voltage VIN is reduced, the output current ILED may be reduced.

The polarity inverter 63 may generate an input detection voltage (hereinafter, a negative input detection voltage VINDN), which is a negative voltage, by inverting the polarity of the input detection voltage VIND.

The multiplier 62 may generate a reference voltage VR5 by multiplying the negative input detection voltage VINDN by the first feedback voltage VFB2.

The line comparator 64 may generate a second feedback voltage VFB3 based on a result of comparison between the line sensing voltage VL and the reference voltage VR5.

The duty determiner 45 may generate a gate voltage VG for controlling a switching operation of a power switch M using a second feedback voltage VFB3. For example, the switching operation of the power switch M may be controlled based on a result of comparison between a voltage obtained by sensing current flowing through the power switch M and the second feedback voltage VFB3 or based on a result of comparison between a sawtooth wave having a predetermined cycle and the second feedback voltage VFB3.

Hereinafter, generation of a reference voltage according to another exemplary embodiment of the invention will be described with reference to FIG. 7.

Figure 7:
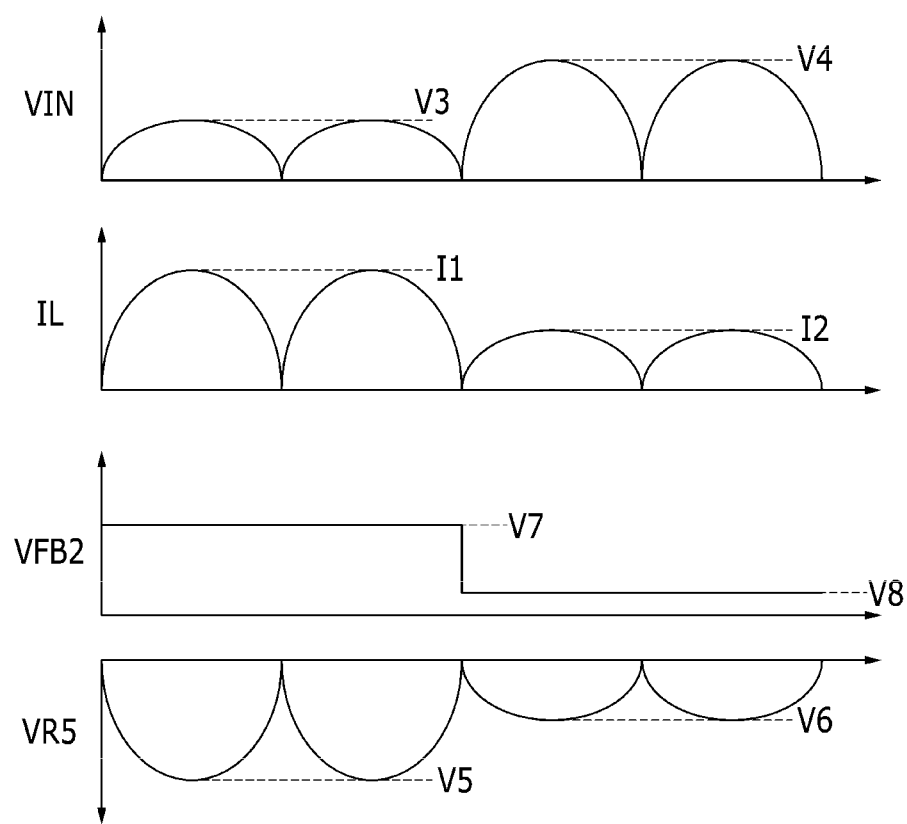
FIG. 7 is a signal waveform diagram of an input voltage, a line current, a first feedback voltage, and a reference voltage according to another exemplary embodiment of the invention.

FIG. 7 is a signal waveform diagram of an input voltage VIN, a line current IL, a first feedback voltage, and a reference voltage VR5 according to another exemplary embodiment of the invention.

As shown in FIG. 7, since a line voltage is a negative voltage, the reference voltage, which is a negative voltage, follows a sine wave synchronized with the input voltage.

As shown in FIG. 7, when a peak of the input voltage VIN has a level of V3, the reference voltage VR5 is generated as a sine wave having the lowest level of V5. The reference voltage VR5 may replace the reference voltage VR and the reference voltage VR2 in the previous embodiments. Thus, as shown in FIG. 7, the line current IL is controlled to follow a sine wave having a peak of I1, thereby improving a power factor. The first feedback voltage VFB2 is maintained at a level of V7 corresponding to an output current ILED, which occurs in response to the input voltage VIN of which the peak has the level of V3.

Current flowing through a filter capacitor CF varies according to the input voltage VIN. As the input voltage VIN increases, a variation in the current flowing through the filter capacitor CF increases. This may result in distortion of the line current IL.

For example, although current supplied to a flyback converter follows a sine wave, the line current IL may be distorted due to the current flowing through the filter capacitor CF, thereby problematically lowering the power factor.

However, according to another exemplary embodiment of the invention, the reference voltage VR5 is generated as a negative-voltage sine wave, which follows the input voltage VIN, to control the line current IL. Thus, the line current IL may be controlled by a sine wave irrespective of the current flowing through the filter capacitor CF.

When the input voltage VIN rises and reaches a peak having a level of V4, as the output current ILED increases, the first feedback voltage VFB2 is reduced to a level of V8. Thus, the level of the first feedback voltage VFB2 multiplied by the negative input detection voltage VINDN is reduced, so the lowest level of the reference voltage VR5 increases to V6 (an absolute value of the reference voltage VR5 is reduced). Due to an increase in the reference voltage VR5, a peak of the line current IL may be reduced to I2 while maintaining the line current IL as a sine wave.

The above-described embodiments provide various modified examples in which a line current is controlled in a desired waveform. Specifically, a reference voltage is generated in a desired waveform, and a line current is regulated in response to the reference voltage, or a power factor is improved.

Hereinafter, in addition to the previous embodiments, a method of sensing an output current without an additional resistor for sensing the output current will be described.

Figure 8:
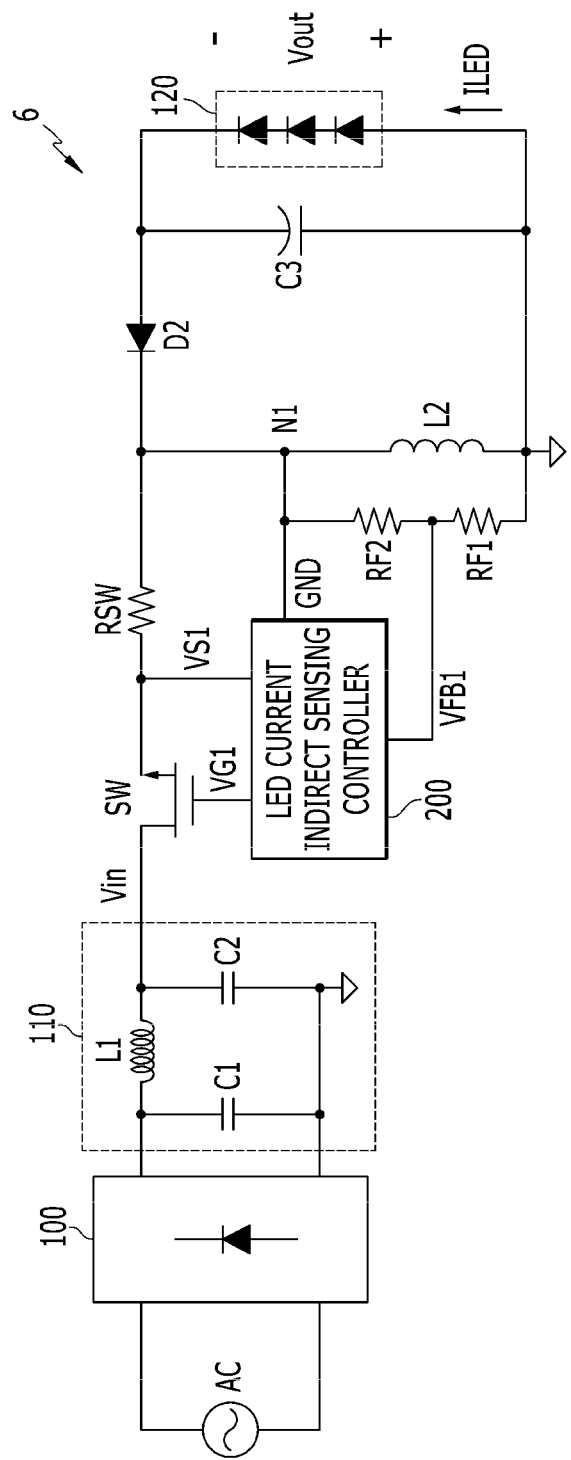
FIG. 8 is a diagram of a power supply according to another exemplary embodiment of the invention.

FIG. 8 is a diagram of a power supply 6 according to another exemplary embodiment of the invention.

As shown in FIG. 8, the power supply 6 may include a rectifier circuit 100, a line filter 110, an LED column 120, an LED current indirect sensing controller 200, a power switch SW, an inductor L2, three resistors RSW, RF1, and RF2, a diode D2, and an output capacitor C3.

The rectifier circuit 100 may rectify an AC input AC, and the rectified input may be transmitted to the power switch SW through the line filter 110. The line filter 110 may filter the noise of an input rectified by a low-pass filter (LPF).

The line filter 110 may include two capacitors C1 and C2 and an inductor L1 connected between both terminals of the rectifier circuit 100. The inductor L1 may be connected between terminals of one side of the respective capacitors C1 and C2, and the terminals of the other side of the two capacitors C1 and C2 may be connected to a ground.

The power switch SW may include a drain connected to an input (hereinafter, input voltage) transmitted through the rectifier circuit 100 and the input filter 110, a source connected to the inductor L2, and a gate to which a gate voltage VG1 is applied.

The resistor RSW for sensing a switch current may be connected between the power switch SW and the inductor L2. A voltage of a contact point at which the source of the power switch SW is connected to the resistor RSW may be referred to as a switch current sensing voltage VS1.

The inductor L2 may include one terminal connected to the power switch SW and a cathode of the diode D2 and the other terminal connected to the ground.

The resistors RF1 and RF2 for generating a feedback voltage VFB1 may be connected in series between both of the terminals of the inductor L2.

The diode D2, which may be a free wheeling diode, may be connected between the inductor L2 and the LED column 120. The output capacitor C3 may be connected in parallel to the LED column 120.

When the power switch SW is turned on, current generated due to an input voltage may flow through the inductor L2 to the ground. Thus, energy may be stored in the inductor L2.

When the power switch SW is turned off, the diode D2 may conduct, and current flowing through the inductor L2 may be supplied to the output capacitor C3 and the LED column 120. In this case, a free wheeling current may flow through the diode D2.

A reference potential GND of the LED current indirect sensing controller 200 may be a voltage of a node N1. The voltage of the node N1 may be a voltage of one terminal of the inductor L2. The voltage of the one terminal of the inductor L2 may be an input voltage Vin when the power switch SW is turned on, and be a voltage −Vout when the power switch SW is turned off.

The feedback voltage VFB1 input to the LED current indirect sensing controller 200 may be a voltage obtained by dividing a voltage between both of the terminals of the inductor L2 by the resistors RF1 and RF2, and be a voltage lower than the reference potential GND. Thus, the feedback voltage VFB1 may be a negative voltage in the LED current indirect sensing controller 200.

Since a voltage between the node N1 and the ground is the input voltage Vin during a turn-on period of the power switch SW, the feedback voltage VFB1 may be −(RF2/(RF1+RF2))*Vin. Since the voltage between the node N1 and the ground is the voltage −Vout during a turn-off period of the power switch SW, the feedback voltage VFB1 may be (RF2/(RF1+RF2))*Vout.

The LED current indirect sensing controller 200 may control a switching operation of the power switch SW using the switch current sensing voltage VS1 and the feedback voltage VFB1.

Conventionally, to directly detect an output current ILED, an additional sensing resistor may be provided between the diode D2 and the one terminal of the inductor L2 or a subsidiary coil, which may be insulatively coupled to the inductor L2, may be used.

However, in a power supply according to another exemplary embodiment of the invention, a voltage between both of the terminals of the inductor L2 may be fed back to sense an output current, without using an additional sensing resistor or subsidiary coil.

After the power switch SW is turned off, the LED current indirect sensing controller 200 may calculate the output current ILED using a period (hereinafter, discharge period) Tdis for which current flows through the inductor L2, a peak of current of the inductor L2, and a switching cycle TS of the power switch SW.

For example, since the peak value of the current of the inductor L2 is current flowing through the power switch SW at a turn-off time point, the peak value of the current of the inductor L2 may correspond to a peak value VSP of the switch current sensing voltage VS1. Since the switch current sensing voltage VS1 is input to the LED current indirect sensing controller 200, the peak value VSP of the switch current sensing voltage VS1 may be calculated.

After the feedback voltage VFB1 rises to a positive voltage at a time point at which the power switch SW is turned off, the feedback voltage VFB1 may be maintained at a predetermined level or higher during the discharge period Tdis of the current of the inductor L2. When the discharge period Tdis ends, the voltage between both of the terminals of the inductor L2 may start to decrease due to resonance. Since the feedback voltage VFB1 is input to the LED current indirect sensing controller 200, the LED current indirect sensing controller 200 may sense the discharge period Tdis using the feedback voltage VFB1. That is, the LED current indirect sensing controller 200 may set a period from a time point at which the power switch SW is turned off to a time point at which the feedback voltage VFB1 becomes lower than a predetermined critical level as the discharge period Tdis.

Also, the LED current indirect sensing controller 200 may be an element configured to control the switching operation, and the switching cycle TS may be set by the LED current indirect sensing controller 200.

Accordingly, the LED current indirect sensing controller 200 may calculate the output current ILED by Equation 1:

$$ILED=((VSP*Tdis)/2)/TS) \tag{1}$$

As described above, in another exemplary embodiment of the invention, an output current may be sensed without an additional resistor or a subsidiary coil. When a resistor is used to sense the output current, power consumption occurs in the resistor. In a primary-side regulation method in which a subsidiary coil is used to sense an output current, a unit cost may increase due to the subsidiary coil.

The present embodiment may solve the above-described problems.

It will be apparent to those skilled in the art that various modifications can be made to the above-described exemplary embodiments of the invention without departing from the spirit or scope of the invention. Thus, it is intended that the invention cover all such modifications provided they come within the scope of the appended claims and their equivalents.

DESCRIPTION OF SYMBOLS 1, 2, 3, 4, 5, 6, and 7: Power supply
10: Dimmer
20 and 100: Rectifier circuit
40 and 45: Duty determiner
RL: Line sensing resistor RL
30: Transformer
D1 and D2: Rectifier diode
COUT and C3: Output capacitor
L, L1, and L2: Inductor
M and SW: Power switch
CF: Filter capacitor
51: Sawtooth wave generator
52, 53, 56, and 59: PWM comparator
41, 42, and 43: SR latch
55 and 61: Output comparator
54 and 64: Line comparator
57: Clamping circuit
110: Line filter
200: LED current indirect sensing controller
RSW, RF1, RF2, RIN1, and RIN2: Resistor
62: Multiplier
63: Polarity inverter

What is claimed is:

1. A power supply comprising:
a power switch coupled to one end of a primary-side coil and configured to control transmission of power;
an inductor coupled to another end of the primary-side coil and a rectifier circuit;
a sensing resistor to receive a line current flowing through the inductor;
an output comparator configured to generate a first feedback voltage based on a difference between a sensing voltage corresponding to an output current of the power supply and a predetermined output reference voltage, wherein a reference voltage is generated based on the first feedback voltage and an input voltage obtained by rectifying an alternating current (AC) input of the power supply;
a multiplier configured to generate the reference voltage by multiplying a voltage corresponding to the input voltage by the first feedback voltage; and
a comparator configured to compare the reference voltage with a line sensing voltage generated by the sensing resistor and generate a feedback voltage, wherein a duty of the power switch is determined using the feedback voltage.

2. The power supply of claim 1, further comprising a duty determiner configured to generate a gate voltage in response to the feedback voltage, wherein the power switch performs a switching operation in response to the gate voltage.

3. The power supply of claim 1, wherein the comparator includes a first terminal to which the reference voltage is input and a second terminal to which the line sensing voltage is input, the comparator being configured to generate the feedback voltage by amplifying a voltage obtained by subtracting the input of the first terminal from the input of the second terminal.

4. The power supply of claim 3, further comprising:
a sawtooth wave generator configured to generate a sawtooth wave; and
a pulse width modulation (PWM) comparator configured to output a result of a comparison between the feedback voltage and the sawtooth wave, wherein the duty of the power switch is controlled in response to the output of the PWM comparator.

5. The power supply of claim 4, further comprising a set-reset (SR) latch including a first terminal to which an oscillator signal is input and a second terminal to which the output of the PWM comparator is input, wherein the SR latch is configured to turn on the power switch in response to the input of the first terminal thereof, and turn off the power switch in response to the input of the second terminal thereof.

6. The power supply of claim 1, wherein the reference voltage has a constant level.

7. The power supply of claim 1, further comprising a clamping circuit configured to control a maximum value of the reference voltage.

8. The power supply of claim 7, wherein the clamping circuit includes a diode including a cathode connected to a clamping voltage and an anode connected to an output terminal of the output comparator, wherein the maximum value of the reference voltage is controlled by the clamping voltage.

9. The power supply of claim 7, further comprising a PWM comparator configured to compare the feedback voltage with a voltage corresponding to current flowing through the power switch, wherein the duty of the power switch is controlled in response to the output of the PWM comparator.

10. The power supply of claim 7, further comprising:
a sawtooth wave generator configured to generate a sawtooth wave; and
a PWM comparator configured to output a result of a comparison between the feedback voltage and the sawtooth wave, wherein the duty of the power switch is controlled in response to the output of the PWM comparator.

11. The power supply of claim 9, wherein the output reference voltage is constant when a phase angle of an input voltage is equal to or higher than a predetermined angle; and
the output reference voltage varies according to the phase angle of the input voltage when the phase angle of the input voltage is lower than the predetermined angle.

12. The power supply of claim 1, further comprising a phase inverter configured to generate a negative input detection voltage by inverting a polarity of an input detection voltage obtained by detecting the input voltage, wherein the negative input detection voltage is a voltage corresponding to the input voltage.

13. The power supply of claim 1, wherein the line current flows from a ground to the rectifier circuit configured to generate an input voltage by rectifying an AC input, the sensing resistor being connected between the ground and the rectifier circuit, and further wherein the line sensing voltage is a negative voltage.

14. A power supply comprising:
a power switch configured to control transmission of power;
a sensing resistor through which a line current flows;
a comparator configured to compare a reference voltage with a line sensing voltage generated by the sensing resistor and generate a feedback voltage; and
a PWM comparator configured to compare the feedback voltage with a voltage corresponding to current flowing through the power switch, wherein the duty of the power switch is controlled in response to the output of the PWM comparator.

15. The power supply of claim 14, further comprising an SR latch including a first terminal to which an oscillator signal is input and a second terminal to which the output of the PWM comparator is input, wherein the SR latch is configured to turn on the power switch in response to the input of the first terminal thereof, and turn off the power switch in response to the input of the second terminal thereof.

16. A power supply configured to supply an output current to a load, the power supply comprising:
a power switch including a first terminal connected to an input voltage;
an inductor connected to a second terminal of the power switch; and
a sensing controller configured to determine the output current using a peak of current of the inductor, a feedback voltage corresponding to a voltage between both terminals of the inductor and a switching cycle of the power switch by:
sensing the peak of the current of the inductor using current flowing through the power switch at a time point at which the power switch is turned off;
sensing a discharge period after the time point at which the power switch is turned off using the feedback voltage; and
calculating the output current using the sensed peak of the current of the inductor, the discharge period, and the switching cycle of the power switch.

17. The power supply of claim 16, wherein the sensing controller is configured to calculate the output current based on a result obtained by multiplying the sensed peak of the current of the inductor by the discharge period and dividing the multiplied value by the switching cycle of the power switch.

\* \* \* \* \*